US012238250B2

(12) United States Patent
Liu

(10) Patent No.: US 12,238,250 B2
(45) Date of Patent: Feb. 25, 2025

(54) IMAGE FORMING APPARATUS FOR DISPLAYING APPROPRIATE OBJECTS ON SCREEN

(71) Applicant: BROTHER KOGYO KABUSHIKI KAISHA, Nagoya (JP)

(72) Inventor: Yuqing Liu, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/620,665

(22) Filed: Mar. 28, 2024

(65) Prior Publication Data

US 2024/0244146 A1 Jul. 18, 2024

Related U.S. Application Data

(63) Continuation of application No. 18/323,541, filed on May 25, 2023, now Pat. No. 11,973,906, which is a
(Continued)

(30) Foreign Application Priority Data

Sep. 28, 2018 (JP) ................................ 2018-184724

(51) Int. Cl.
*H04N 1/00* (2006.01)
(52) U.S. Cl.
CPC ..... *H04N 1/00432* (2013.01); *H04N 1/00411* (2013.01); *H04N 1/00424* (2013.01);
(Continued)
(58) Field of Classification Search
None
See application file for complete search history.

(56) References Cited

U.S. PATENT DOCUMENTS

| 2013/0018940 A1 | 1/2013 | Ookuma |
| 2014/0198344 A1 | 7/2014 | Hirata |

(Continued)

FOREIGN PATENT DOCUMENTS

| JP | 2014-135029 A | 7/2014 |
| JP | 2016-071680 A | 5/2016 |

(Continued)

OTHER PUBLICATIONS

Japanese Office Action (with English translation) dated Feb. 22, 2022 (Application No. 2018-184724).
(Continued)

*Primary Examiner* — Lennin R Rodriguezgonzalez
(74) *Attorney, Agent, or Firm* — KENEALY VAIDYA LLP

(57) ABSTRACT

An image forming apparatus includes a controller configured to, when a first user is logging in to the image forming apparatus, display a plurality of first icons to be arranged in a particular form of a plurality of rows and a plurality of columns within a particular area on a standby screen. The plurality of first icons include an icon associated with the image scanning processing, an icon associated with the copy processing, and one or more icons not associated with image processing. The controller is further configured to, in said displaying the plurality of first icons, display, as the plurality of first icons, one or more icons associated with the first user, and one or more icons not associated with a second user, without displaying any icons associated with the second user, and display information other than the plurality of first icons outside the particular area.

18 Claims, 9 Drawing Sheets

Related U.S. Application Data continuation of application No. 18/055,446, filed on Nov. 15, 2022, now Pat. No. 11,856,162, which is a continuation of application No. 16/920,919, filed on Jul. 6, 2020, now Pat. No. 11,558,513, which is a continuation of application No. 16/575,833, filed on Sep. 19, 2019, now Pat. No. 10,742,824.

(52) U.S. Cl.
CPC ..... *H04N 1/00482* (2013.01); *H04N 1/00506* (2013.01); *H04N 1/00511* (2013.01)

(56) References Cited

U.S. PATENT DOCUMENTS

| | | |
|---|---|---|
| 2014/0366123 A1 | 12/2014 | Dibona |
| 2019/0042066 A1 | 2/2019 | Kim |
| 2019/0356797 A1 | 11/2019 | Nagasawa |

FOREIGN PATENT DOCUMENTS

| | | |
|---|---|---|
| JP | 2018-504657 A | 2/2018 |
| JP | 2018-128977 A | 8/2018 |
| JP | 2019-201282 A | 11/2019 |
| WO | 2016/085696 A1 | 6/2016 |

OTHER PUBLICATIONS

Japanese Office Action (with English translation) dated May 24, 2022 (Application No. 2018-184724).

<TAB SETTING TABLE>

| INDEX | ATTRIBUTE | TAB NAME |
|---|---|---|
| 1st TAB | SHARED | BASIC FUNCTIONS 1 |
| 2nd TAB | SHARED | BASIC FUNCTIONS 2 |
| 3rd TAB | PERSONAL | CUSTOM 1 |
| 4th TAB | PERSONAL | CUSTOM 2 |
| 5th TAB | PERSONAL | CUSTOM 3 |
| 6th TAB | PERSONAL | CUSTOM 4 |
| 7th TAB | PERSONAL | CUSTOM 5 |
| 8th TAB | PERSONAL | CUSTOM 6 |
| ⋮ | ⋮ | ⋮ |
| Nt-th TAB | PERSONAL | xxx |

FIG. 3

<USER LIST>

| USER NAME | PERSONAL REGISTRATION TAB |
|---|---|
| USER A | 3rd TAB (PERSONAL) |
| USER B | 4th TAB (PERSONAL) |
| USER C | 2nd TAB (SHARED) |
| USER D | OFF |
| ⋮ | ⋮ |

FIG. 4

IMAGE FORMING APPARATUS FOR DISPLAYING APPROPRIATE OBJECTS ON SCREEN

REFERENCE TO RELATED APPLICATIONS

This application is a continuation of U.S. patent application Ser. No. 18/323,541, filed on May 25, 2023, which is a continuation of U.S. patent application Ser. No. 18/055,446, filed on Nov. 15, 2022, now U.S. Pat. No. 11,856,162, issued on Dec. 26, 2023, which is a continuation of U.S. patent application Ser. No. 16/920,919, filed on Jul. 6, 2020, now U.S. Pat. No. 11,558,513, issued on Jan. 17, 2023, which is a continuation of U.S. patent application Ser. No. 16/575,833, filed on Sep. 19, 2019, now U.S. Pat. No. 10,742,824, issued on Aug. 11, 2020, and claims priority under 35 U.S.C. § 119 from Japanese Patent Application No. 2018-184724 filed on Sep. 28, 2018, which is incorporated herein by reference in its entirety.

BACKGROUND ART

Technical Field

Aspects of the present disclosure are related to an image forming apparatus for displaying appropriate objects on a screen.

Related Art

Heretofore, a multi-function peripheral (hereinafter referred to as an "MFP") has been known that is configured to display an object list screen. When no registered user is logging in to the MFP, one or more shared objects (e.g., icons) each associated with one or more functions available to all users are displayed on the object list screen. Meanwhile, when a specific registered user is logging in to the MFP, the MFP displays, on the object list screen, only a personal object associated with one or more functions registered by the specific registered user, without displaying any shared objects.

DESCRIPTION

Summary

In the known MFP configured as above, no shared object is displayed on the object list screen, when a registered user is logging in to the MFP. Therefore, it is difficult for the login user to use the functions associated with the shared objects. Of course, the user is allowed to use the functions associated with the shared objects, after logging out from the MFP and bringing the MFP back into the state where no registered user is logging in to the MFP. Nonetheless, the MFP is not user-friendly in that the login user is unable to easily use the functions associated with the shared objects until the user logs out from the MFP.

Aspects of the present disclosure are advantageous to provide one or more improved techniques for an image forming apparatus that make it possible to display appropriate objects (e.g., icons) on a screen depending on whether a specific registered user is logging in to the image forming apparatus and to improve user-friendliness of the image forming apparatus even when a specific registered user is logging in to the image forming apparatus.

According to aspects of the present disclosure, an image forming apparatus is provided, which includes a user interface including a display, an image scanner, a printer, and a controller. The controller is configured to perform a plurality of types of image processing including image scanning processing with the image scanner and copy processing with the image scanner and the printer. The controller is further configured to cause the display to display a standby screen configured to display thereon a selected one of a plurality of screens switchable from one screen to another. The controller is further configured to, when a first user is logging in to the image forming apparatus, display a plurality of first icons to be arranged in a particular form of a plurality of rows and a plurality of columns within a particular area on the standby screen. The plurality of first icons are enabled to include an icon associated with the image scanning processing, an icon associated with the copy processing, and one or more icons not associated with the plurality of types of image processing. The controller is further configured to, when the first user is logging in to the image forming apparatus, in said displaying the plurality of first icons, display, as the plurality of first icons, one or more icons associated with the first user, and one or more icons not associated with a second user, to be arranged in the particular form within the particular area, without displaying any icons associated with the second user. The second user is different from the first user. The controller is further configured to, when the first user is logging in to the image forming apparatus, display information other than the plurality of first icons outside the particular area. The controller is further configured to, when the second user is logging in to the image forming apparatus, display the plurality of second icons to be arranged in the particular form of the plurality of rows and the plurality of columns within the particular area on the standby screen. The plurality of second icons are enabled to include the icon associated with the image scanning processing, the icon associated with the copy processing, and the one or more icons not associated with the plurality of types of image processing. The controller is further configured to, when the second user is logging in to the image forming apparatus, in said displaying the plurality of second icons, display, as the plurality of second icons, one or more icons associated with the second user, and one or more icons not associated with the first user, to be arranged in the particular form within the particular area, without displaying any icons associated with the first user. The controller is further configured to, when the second user is logging in to the image forming apparatus, display information other than the plurality of second icons outside the particular area.

BRIEF DESCRIPTION OF THE ACCOMPANYING DRAWINGS

FIG. 3 shows an example of a tab setting table on which a plurality of tabs displayable on the standby screen are registered, in the illustrative embodiment according to one or more aspects of the present disclosure.

FIG. 4 shows an example of a user list on which registered users are listed in association with respective personal registration tab, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
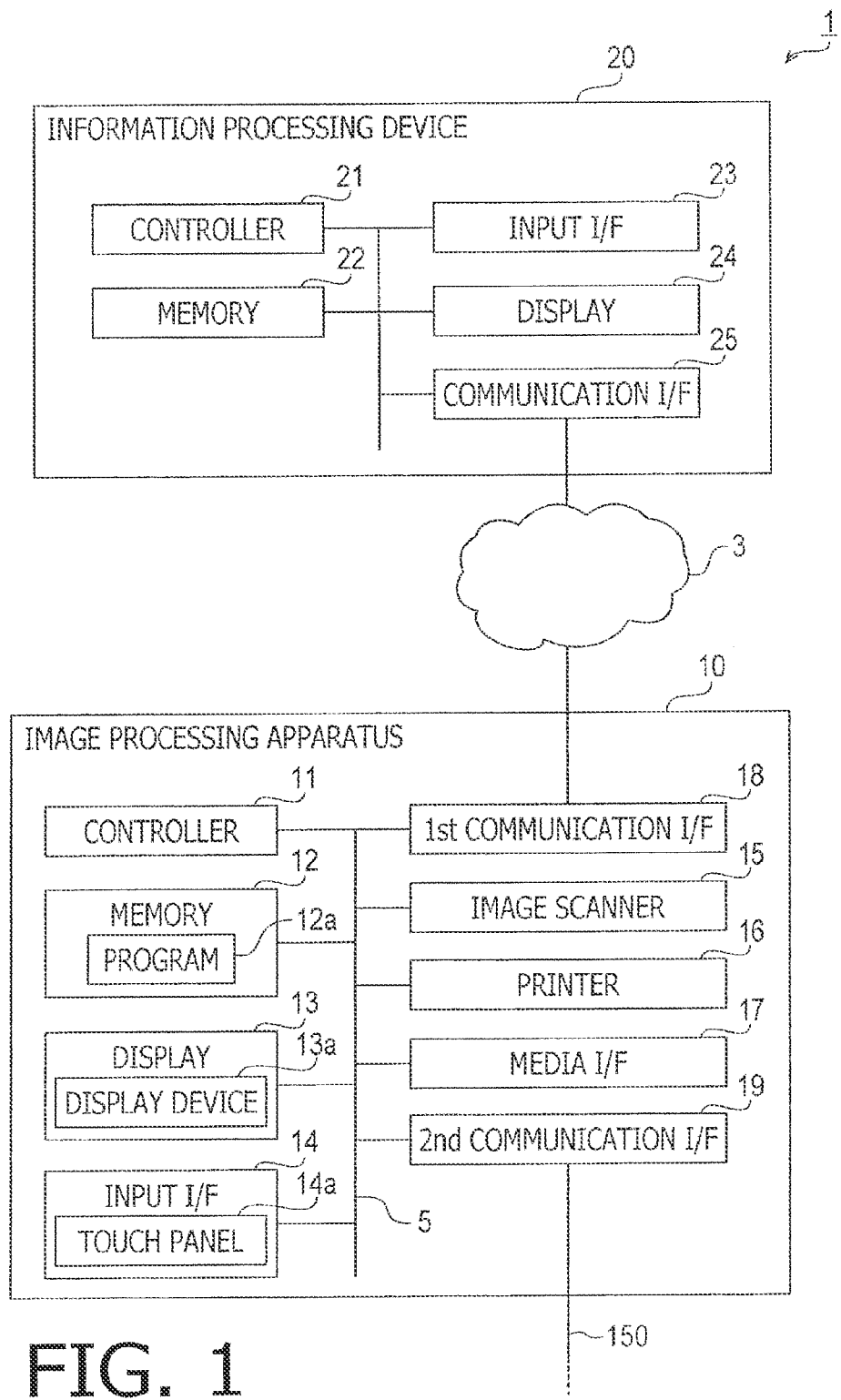
FIG. 1 is a block diagram schematically showing a configuration of an information processing system including an image processing apparatus and an information processing device, in an illustrative embodiment according to one or more aspects of the present disclosure.

Illustrative Embodiment (1) General Overview of Information Processing System As shown in FIG. 1, an information processing system in the illustrative embodiment includes an image processing apparatus 10 and an information processing device 20. The image processing apparatus 10 and the information processing device 20 are communicably connected with each other via a network 3. The network 3 may be any type of network. For instance, the network 3 may be a wired communication network or a wireless communication network. Further specifically, the network 3 may be a wired communication network according to any type of wired communication protocol, or may be a wireless communication network according to any type of wireless communication protocol.

(2) Configuration of Image Processing Apparatus

The image processing apparatus 10 has a plurality of functions such as a scanning function, a printing function, a copy function, and a facsimile function. The scanning function is a function to scan an image of a document sheet and generate image data of the scanned image. The printing function is a function to print an image on a recording sheet. The copy function is a function to print the image scanned with the scanning function, on a recording sheet with the printing function. The facsimile function is a function to communicate facsimile data.

As shown in FIG. 1, the image processing apparatus 10 includes a controller 11, a memory 12, a display 13, an input I/F ("I/F" is an abbreviation of "interface") 14, an image scanner 15, a printer 16, a media I/F 17, a first communication I/F 18, and a second communication I/F 19. The above elements included in the image processing apparatus 10 are interconnected via a bus 5.

The controller 11 includes one or more CPUs. The memory 12 includes one or more semiconductor memories such as a ROM, a RAM, an NVRAM, and a flash memory. In other words, the image processing apparatus 10 includes a microcomputer including the one or more CPUs and the one or more semiconductor memories.

The controller 11 may achieve various functions by executing programs stored in a non-transitory computer-readable medium. The non-transitory computer-readable medium may be included in the memory 12. It is noted that all the various functions achieved by the controller 11 may not necessarily be achieved by executing programs stored in a non-transitory computer-readable medium. At least part of the various functions may be achieved by one or more hardware elements (e.g., ASICs) included in the controller 11.

The memory 12 stores data of various screens including a below-mentioned standby screen 40 (see FIGS. 2A, 2B, and 5A to 5D). Further, the memory 12 stores data of a tab setting table (see FIG. 3), data of a user list (see FIG. 4), and a program 12a for a below-mentioned standby screen display process (see FIGS. 6 to 8).

The display 13 includes a display device 13a configured to display various kinds of information. The input I/F 14 includes one or more input devices such as a touch panel 14a. The touch panel 14a is overlaid on an image display area of the display device 13a.

The touch panel 14a is configured to detect an indicating operation of indicating a position of the image display area by an indicator in contact with or in proximity to the image display area. Specifically, the touch panel 14a is configured to, when the indicator is indicating a position of the image display area of the display device 13a, continuously or periodically output positional information representing the position indicated by the indicator.

For instance, the touch panel 14a may be configured to detect the position indicated by the indicator only when the indicator is in contact with the image display area of the display device 13a. In another instance, the touch panel 14a may be configured to detect the position indicated by the indicator only when the indicator is in proximity to the image display area without contacting the image display area. In a further instance, the touch panel 14a may be configured to detect the position indicated by the indicator in any case where the indicator is in contact with or in proximity to the image display area.

The controller 11 obtains the positional information output from the touch panel 14a. Further, based on the obtained positional information, the controller 11 may detect whether the indicating operation using the indicator is being performed, which position is indicated by the indicator when the indicating operation is being performed, and what type of particular operation is being performed as the indicating operation using the indicator.

Examples of the particular operation detectable by the controller 11 may include, but are not limited to, a tapping operation, a flicking operation, and a dragging operation. The tapping operation is an operation of bringing the indicator into contact with or in proximity to a position of the image display area and thereafter separating the indicator from the image display area in the same position. Examples of the indicator usable for the indicating operation may include, but are not limited to, a user's finger, and a specific indicating device such as a stylus pen.

The image scanner 15 includes an image sensor. The image scanner 15 is configured to scan an image of a document sheet by the image sensor, and generate image data of the scanned image. The printer 16 includes a print mechanism using an inkjet technology or an electrophotographic technology. The printer 16 is configured to print an image on a recording sheet.

The media I/F 17 is configured to, when a storage medium is inserted therein, control writing data into the storage medium and reading data from the storage medium. Various types of storage media such as USB flash memories may be inserted into the media I/F 17.

The first communication I/F 18 is configured to connect the image processing apparatus 10 with the network 3. The image processing apparatus 10 may perform wireless or wired data communication with information processing devices such as PCs, smartphones, and tablet terminals via the first communication I/F 17. The image processing apparatus 10 may connect with an Internet via the first communication I/F 18 and perform data communication with servers and/or information processing devices via the Internet.

The second communication I/F 19 is configured to communicate with external devices via a communication network 150. Examples of the communication network 150 may include, but are not limited to, a public telephone network. Facsimile data communication using the facsimile function is basically performed via the second communication I/F 19.

(3) Configuration of Information Processing Device

Examples of the information processing device 20 may include, but are not limited to, a PC, a tablet terminal, and a smartphone. As shown in FIG. 1, the information processing device 20 includes a controller 21, a memory 22, an input I/F 23, a display 24, and a communication I/F 25.

The controller 21 includes one or more CPUs. The memory 22 includes one or more semiconductor memories such as a ROM, a RAM, an NVRAM, and a flash memory. In other words, the information processing device 20 includes a microcomputer including the one or more CPUs and the one or more semiconductor memories. The memory 22 stores various kinds of software and data.

The display 24 includes a display device (e.g., a liquid crystal display device and an organic EL display device) configured to display images. The input I/F 23 includes one or more input devices configured to accept various types of input operations. The one or more input devices included in the input I/F 23 may include a keyboard, a mouse and a touch panel. The touch panel may be overlaid on a display area of the display device included in the display 24.

The communication I/F 25 is configured to communicate with external devices via the network 3. The information processing device 20 may perform data communication with the image processing apparatus 10 via the communication I/F 25.

(4) Explanation of Standby Screen

Figure 2A:
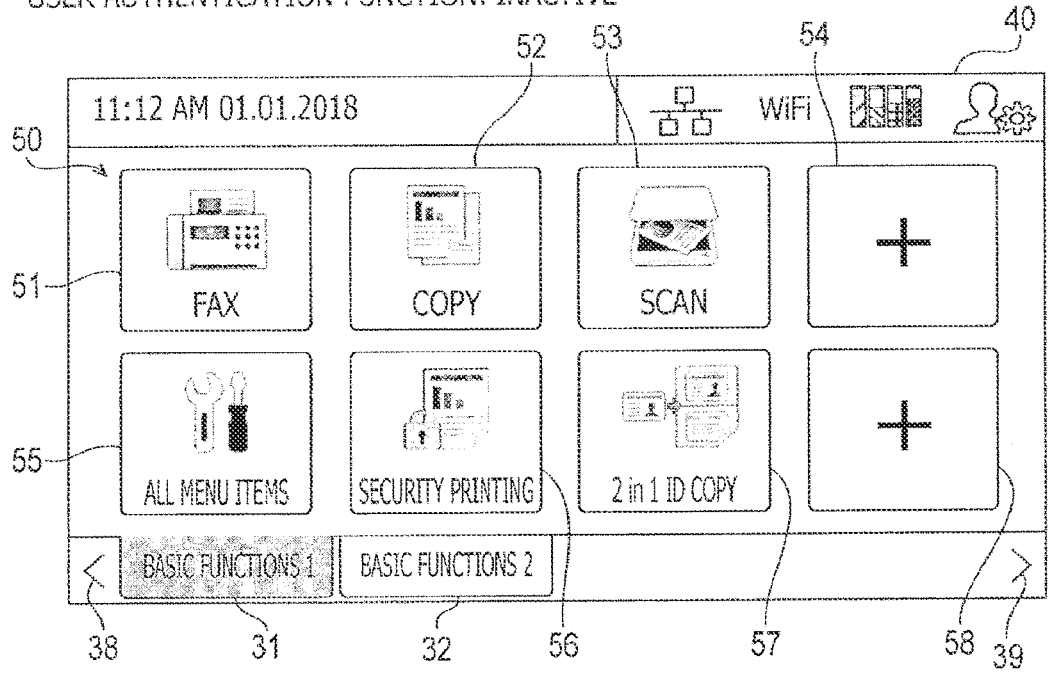
FIG. 2A shows an example of a standby screen displayed when a user authentication function is set inactive, in the illustrative embodiment according to one or more aspects of the present disclosure.
Figure 2B:
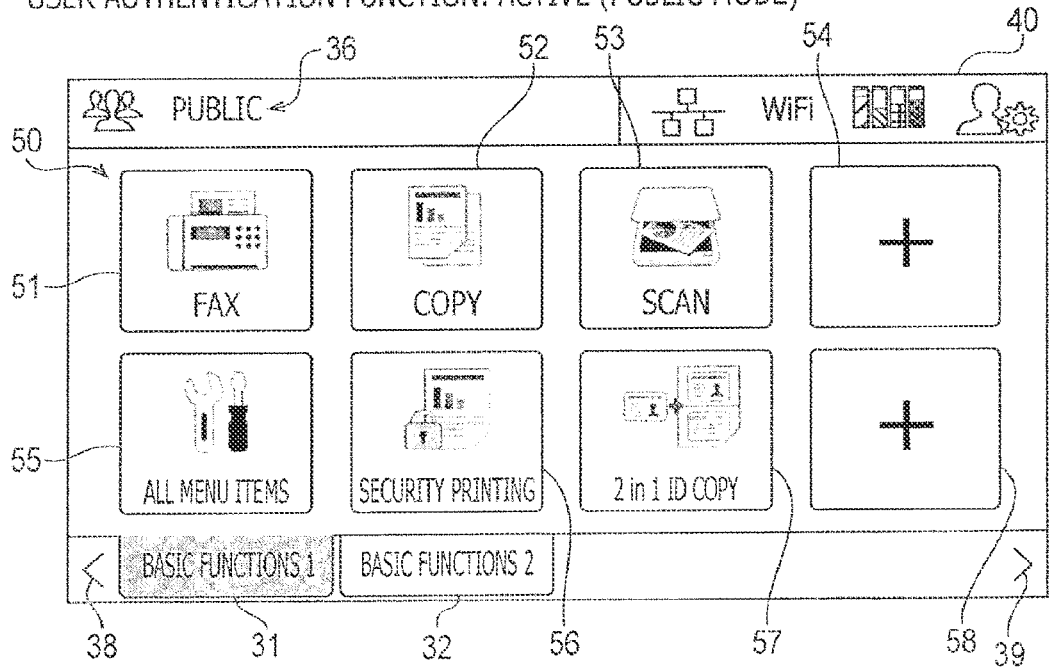
FIG. 2B shows an example of the standby screen displayed when the user authentication function is set active, and a user mode is set to a public mode, in the illustrative embodiment according to one or more aspects of the present disclosure.

After the controller 11 of the image processing apparatus 10 is booted, a standby screen 40 as shown in FIG. 2A or 2B is displayed on the display device 13a. The standby screen 40 is a tabbed screen having a plurality of tabs 31, 32, - - - .

The tabs displayed on the standby screen 40 may vary depending on whether a below-mentioned user authentication function is set active or inactive. Further, even when the user authentication function is set active, the tabs displayed on the standby screen 40 may vary depending on a below-mentioned user mode or a login user.

The plurality of tabs 31, 32, - - - are associated with individual tab screens 50, respectively. On the standby screen 40, a tab screen 50 associated with a selected one of the plurality of tabs 31, 32, - - - is displayed. The selected tab is displayed in a different manner from the other tab(s). FIG. 2A shows an example in which a first tab 31 having a tab name "Basic Functions 1" is selected and displayed in a different manner (e.g., a different color and a different size) from the other tab(s).

The memory 12 stores various kinds of information for displaying the standby screen 40. Further, the memory 12 stores information regarding processes to be executed when various input operations are performed onto the standby screen 40 via the input I/F 14.

An individual tab screen 50 associated with each tab includes a plurality of icons arranged thereon. In the illustrative embodiment, for instance, 8 icons are arranged on each single tab screen 50. Specifically, as shown in FIG. 2A, first to eighth icons 51 to 58 are arranged on each tab screen 50. A specific function associated with each icon may be changed.

Each icon displayed on each tab screen 50 is associated with a specific process in a specific function. When the user taps one of the icons, a specific process associated with the tapped icon is performed.

For instance, on the tab screen 50 shown in FIG. 2A, the first icon 51 is associated with a specific process in the facsimile function. Further, the second icon 52 is associated with a specific process in the copy function. Further, the third icon 53 is associated with a specific process in the scanning function. The fourth icon 54 and the eighth icon 58 are unregistered icons not associated with any specific processes. The user may register specific processes in association with the unregistered icons. Explanations of the fifth to seventh icons 55 to 57 will be omitted.

The tabs displayed on the standby screen 40 are managed on the tab setting table shown in FIG. 3. On the tab setting table, Nt tabs are listed in a particular order. It is noted that "Nt" is an arbitrary number. In the illustrative embodiment, as shown in FIG. 3, the particular order is a sequence of a first tab, a second tab, a third tab, - - - , and an Nt-th tab.

An attribute is set for each tab. In the illustrative embodiment, "Shared" or "Personal" is set as the attribute of each tab. The attribute of each tab may be individually and arbitrarily changed. FIG. 3 shows an example in which the attributes of the first and second tabs are set to "Shared," and the attributes of the other tabs are set to "Personal."

Further, a specific name is assigned to each tab. The name of an individual tab is displayed on the tab when the tab is displayed on the standby screen 40. The name of each tab may be individually and arbitrarily changed. For instance, the tab setting table may be previously stored in the memory 12 of the image processing apparatus 10. In this case, the user may arbitrarily customize the tab setting table stored in the memory 12.

In another instance, the tab setting table may be obtained from an external device (e.g., the information processing device 20) at particular timing and then stored into the memory 12. In the illustrative embodiment, the tab setting table may be arbitrarily customized on the information processing device 20. In response to being booted, the controller 11 of the image processing apparatus 10 receives the tab setting table from the information processing device 20 via the network 3, and stores the received tab setting table into the memory 12. Afterward, the controller 11 displays the standby screen 40 with reference to the tab setting table stored in the memory 12.

Even after storing the tab setting table into the memory 12, the controller 11 may obtain a new tab setting table from the information processing device 20 at particular timing and replace the tab setting table stored in the memory 12 with the obtained new tab setting table.

In the illustrative embodiment, an arrangement direction along which the tabs are arranged on the standby screen 40 is a rightward direction. Namely, each of the tabs is sequentially arranged in the rightward direction. An arrangement order in which the tabs are arranged along the arrangement direction is basically an ascending order of the aforementioned particular order in which the Nt tabs are listed on the tab setting table. In this regard, however, the arrangement order of the tabs may be adjusted in such a manner as will be described later.

In the illustrative embodiment, up to four tabs are concurrently displayable on the standby screen 40. The total number Nt of the tabs listed on the tab setting table is more than 4 which is a maximum number of tabs displayable concurrently on the standby screen 40. Hereinafter, the maximum number of tabs displayable concurrently on the standby screen 40 may be referred to as the "maximum concurrently-displayable tab number." FIGS. 2A and 2B show examples in which the first tab 31 and the second tab 32 are displayed on the standby screen 40 among the Nt tabs containing the first to Nt-th tabs.

On the standby screen 40A, a leftward button 38 and a rightward button 39 are displayed near both ends of a tab display area in which one or more tabs are displayed in a left-to-right direction, respectively. For instance, when four tabs are displayed among five tabs to be displayed, the user may tap the leftward button 38 or the rightward button 39 to scroll the tabs leftward or rightward, thereby displaying an unshown tab on the standby screen 40.

For instance, when the user wishes to change the tab screen associated with the currently selected tab to another tab screen associated with another tab, the user may tap the another tab. When a tab other than the currently selected tab is tapped, the tapped tab is brought into a selected state, and a tab screen associated with the newly selected tab is displayed on the standby screen 40.

The image processing apparatus 10 has the user authentication function settable active or inactive. The user authentication function may be set active or inactive, for instance, on the image processing apparatus 10 or remotely from an external device (e.g., the information processing device 20) via the network 3.

FIG. 2A shows an example of the standby screen 40 displayed when the user authentication function is set inactive. When the user authentication function is set active, only tabs having the attribute "Shared" are displayed on the standby screen 40.

When the user authentication function is set active, a user mode of the image processing apparatus 10 is set to a public mode or a personal mode. The public mode is a user mode in which any registered user is not logging in to the image processing apparatus 10. In other words, the public mode is a user mode settable by all users with no need for an authentication process (e.g., inputting a password). The personal mode is set when one of previously registered users (hereinafter simply referred to as "registered users") performs a particular user authentication operation to log in to the image processing apparatus 10. Namely, when one of the registered users logs in to the image processing apparatus 10, the user mode of the image processing apparatus 10 is set to the personal mode for the login user.

The registered user may have been registered directly on the image processing apparatus 10 or indirectly via an external device such as the information processing device 20. For instance, a user list as shown in FIG. 4 is managed on the information processing device 20. On the user list, the registered users are listed. Further, on the user list, a personal registration tab may be registered in association with each registered user. When a new user is registered on the information processing device 20, the newly registered user is added onto the user list. Further, a personal registration tab may be arbitrarily registered for the newly registered user.

The user list shown in FIG. 4 represents that at least four users A, B, C, and D are registered. Further, the third tab is registered as a personal registration tab for the user A. The fourth tab is registered as a personal registration tab for the user B. The second tab is registered as a personal registration tab for the user C. No personal registration tab is registered for the user D. Any tab having "Shared" or "Personal" as the attribute thereof may be registered as a personal registration tab. Nonetheless, in the illustrative embodiment, a single tab is allowed to be registered only for a single registered user. Namely, a single tab is not allowed to be registered in common for a plurality of registered users.

For instance, the user list may be managed on the image processing apparatus 10. In another instance, the user list may be basically managed on the information processing device 20, and the image processing apparatus 10 may obtain the user list as needed from the information processing device 20. In the illustrative embodiment, each time a registered user logs in to the image processing apparatus 10, the image processing apparatus 10 performs data communication with the information processing device 20, thereby referring to the user list managed on the information processing device 20 and obtaining information representing a personal registration tab associated with the login user.

For instance, an individual registered user may log in to the image processing apparatus 10 by performing a particular authentication process including an operation of inputting specific user authentication information (e.g., a password) for the registered user via the input I/F 14.

The tabs displayed on the standby screen 40 vary depending on whether the user mode of the image processing apparatus 10 is the public mode or the personal mode. Further, even when the user mode is set to the personal mode, the tabs displayed on the standby screen 40 vary depending on which registered user is logging in to the image processing apparatus 10.

When the user authentication function is set active, as shown in FIG. 2B, a user-mode switching I/F 36 is displayed on the standby screen 40. The user-mode switching I/F 36 is an image for accepting a user operation (e.g., tapping) to switch the user mode.

The user-mode switching I/F 36 shows information representing the current user mode. In the illustrative embodiment, for instance, when the user mode is set to the public mode, as shown in FIG. 2B, the user-mode switching I/F 36 shows a text "Public" representing the public mode. Further, when the user mode is set to the personal mode, as shown in FIGS. 5A to 5D, the user-mode switching I/F 36 shows information representing a login user.

When the user-mode switching I/F 36 is tapped, a user-mode selecting screen (not shown) is displayed on the display 13. On the user-mode selecting screen, the public mode and each registered user are displayed as selectable options. When the public mode is selected, the user mode is set to the public mode.

When the user mode is set to the public mode, tabs having the attribute "Shared" are displayed on the standby screen 40, and one of the displayed tabs is brought into a selected state. In the public mode, any tab having the attribute "Personal" is not displayed.

In the illustrative embodiment, as shown in FIG. 3, the attributes of the first and second tabs are "Shared." Therefore, as shown in FIG. 2B, the first tab 31 and the second tab 32 are displayed on the standby screen 40 in the public mode.

Meanwhile, when one of the registered users is selected on the user-mode selecting screen, an authentication screen (not shown) is displayed. When formal user authentication information for the selected registered user is input via the authentication screen, the selected registered user is successfully authenticated to log in to the image processing apparatus 10. Further, at this time, the user mode is set to the personal mode for the selected registered user.

In the personal mode for the specified registered user, a personal registration tab associated with the specified registered user is obtained from the user list (see FIG. 4) and displayed on the standby screen 40. Further, in the personal mode, the tabs having the attribute "Shared" are also displayed on the standby screen 40. In the personal mode, any tub having the attribute "Personal" except the personal registration tab for the specified registered user is not displayed on the standby screen 40.

Figure 5A:
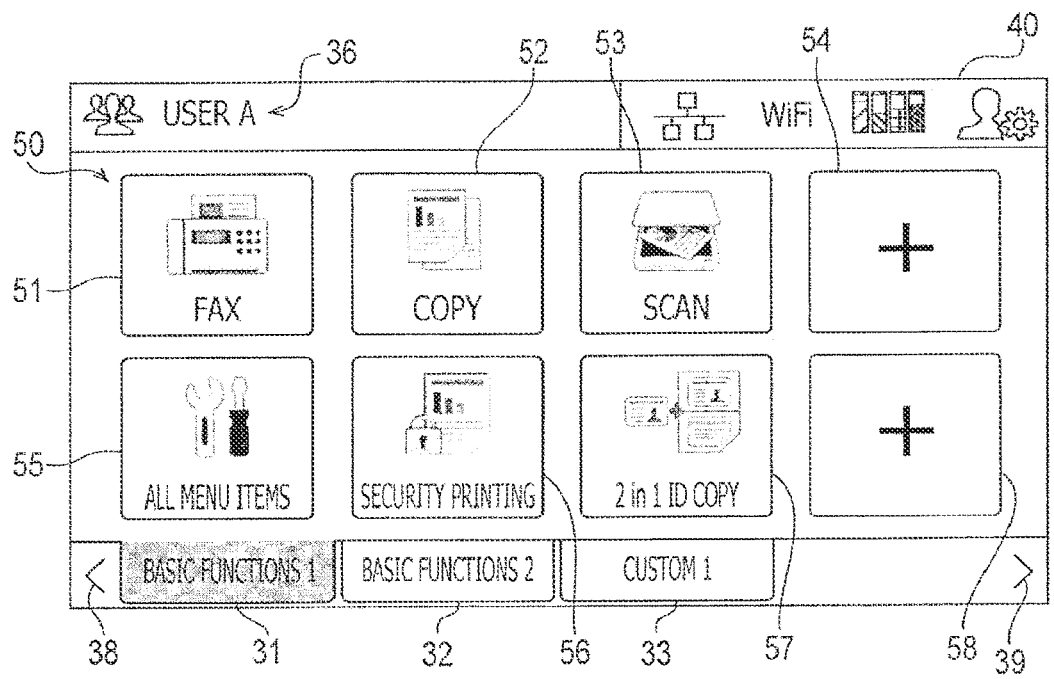
FIG. 5A shows an example of the standby screen displayed in a personal mode where a user A is logging in to the image processing apparatus, in the illustrative embodiment according to one or more aspects of the present disclosure.

For instance, the user A is associated with the third tab as the personal registration tab thereof on the user list. Hence, when the user A is logging in to the image processing apparatus 10, as shown in FIG. 5A, the third tab 33 is displayed on the standby screen 40. In addition, the first tab 31 and the second tab 32 having the attribute "Shared" are displayed as well.

Figure 5B:
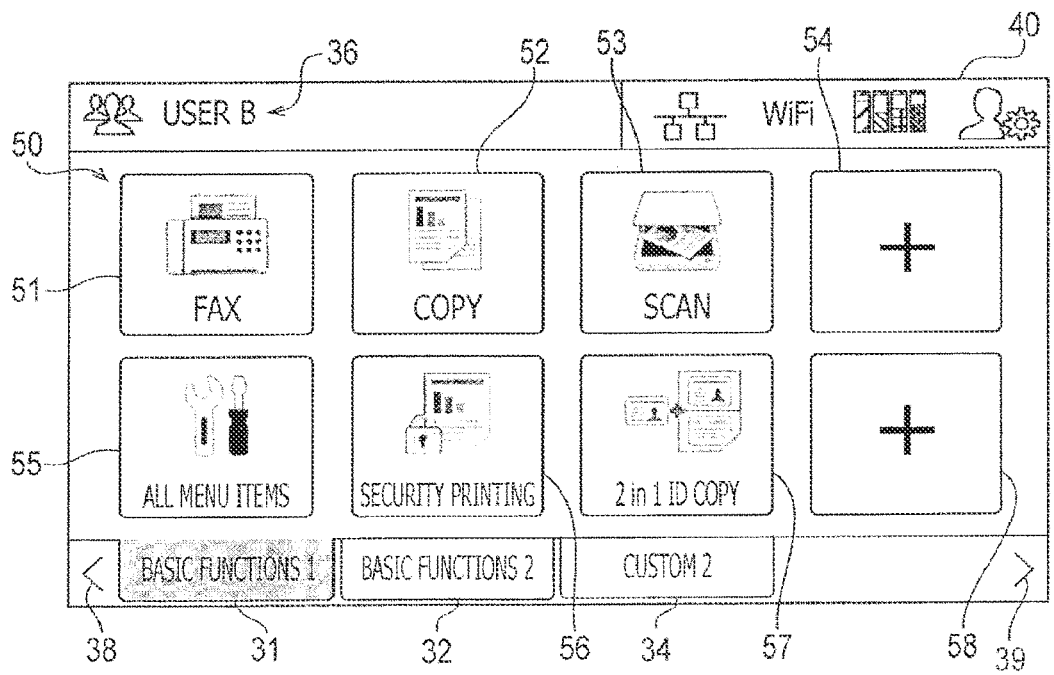
FIG. 5B shows an example of the standby screen displayed in the personal mode where a user B is logging in to the image processing apparatus, in the illustrative embodiment according to one or more aspects of the present disclosure.

Further, for instance, the user B is associated with the fourth tab as the personal registration tab thereof on the user list. Hence, when the user B is logging in to the image processing apparatus 10, as shown in FIG. 5B, the fourth tab 34 is displayed on the standby screen 40. In addition, the first tab 31 and the second tab 32 having the attribute "Shared" are displayed as well.

Figure 5C:
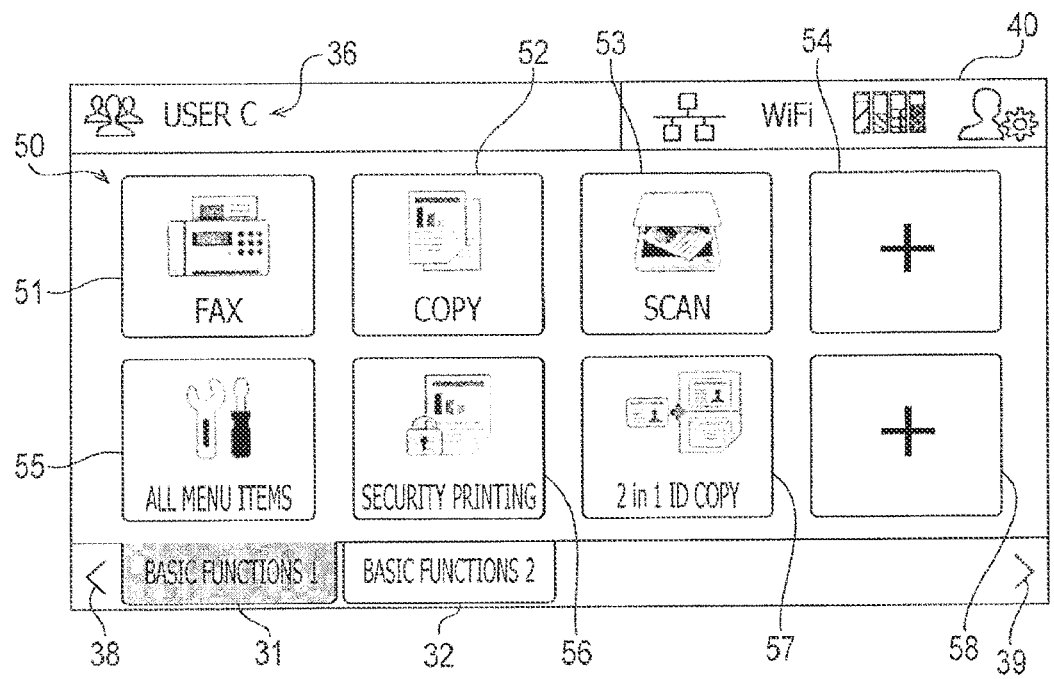
FIG. 5C shows an example of the standby screen displayed in the personal mode where a user C is logging in to the image processing apparatus, in the illustrative embodiment according to one or more aspects of the present disclosure.

Further, for instance, the user C is associated with the second tab as the personal registration tab thereof on the user list. Hence, when the user C is logging in to the image processing apparatus 10, as shown in FIG. 5C, the second tab 32 is displayed on the standby screen 40. In addition, the first tab 31 having the attribute "Shared" is displayed as well. Namely, in the illustrative embodiment, since the attribute of the personal registration tab for the user C is "Shared," the standby screen 40 when the user C is logging in to the image processing apparatus 10 is the same as the standby screen 40 when the user mode is set to the public mode.

Figure 5D:
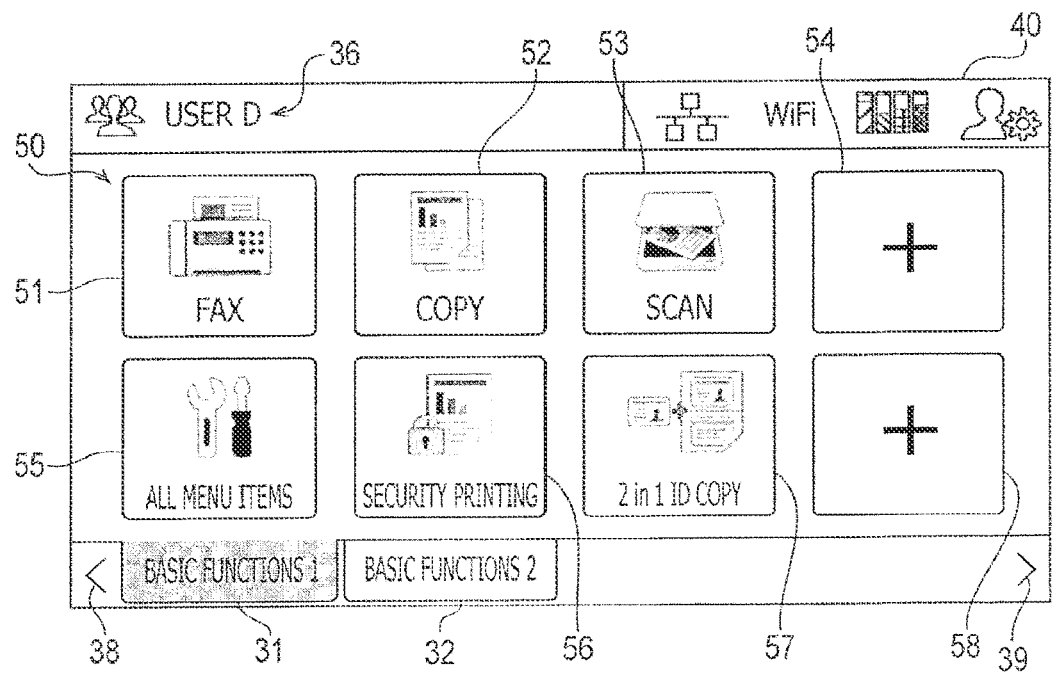
FIG. 5D shows an example of the standby screen displayed in the personal mode where a user D is logging in to the image processing apparatus, in the illustrative embodiment according to one or more aspects of the present disclosure.

Further, for instance, the user D is not associated with any personal registration tab on the user list. Hence, when the user D is logging in to the image processing apparatus 10, as shown in FIG. 5D, no personal registration tab is displayed on the standby screen 40, though the first tab 31 and the second tab 32 having the attribute "Shared" are displayed.

It may be appropriately determined which tab is brought into the selected state on the standby screen 40 first displayed after the login user is changed. In the illustrative embodiment, for instance, a first one, in the above particular order, of the tabs displayed on the standby screen 40 is brought into the selected state.

(5) Standby Screen Display Process

Subsequently, referring to FIGS. 6 to 8, an explanation will be provided of a standby screen display process to be performed by the controller 11 of the image processing apparatus 10. After activated, the controller 11 loads, from the memory 12, the program 12*a* for the standby screen display process and executes the loaded program 12*a*.

Figure 6:
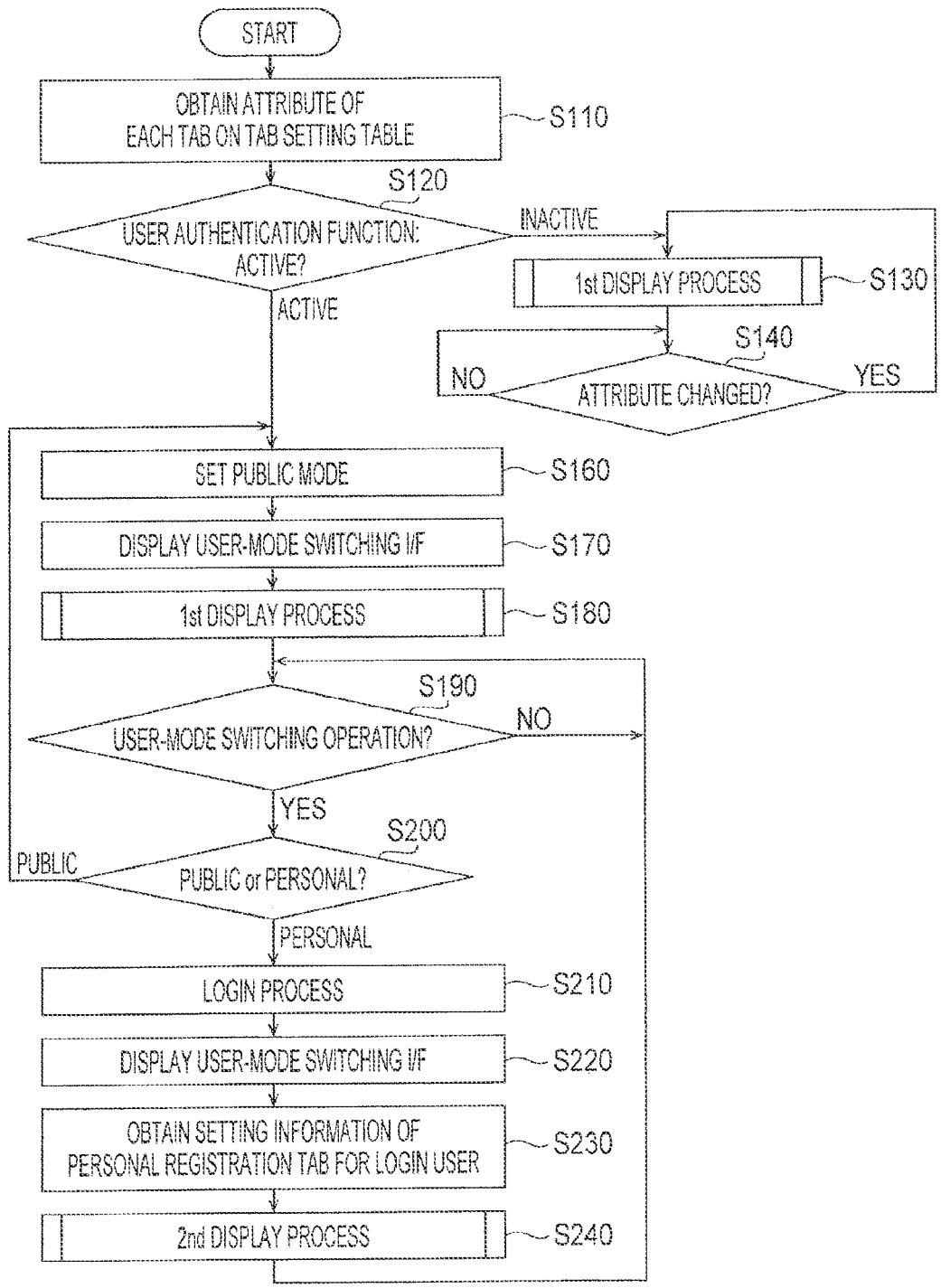
FIG. 6 is a flowchart showing a procedure of a standby screen display process, in the illustrative embodiment according to one or more aspects of the present disclosure.

As shown in FIG. 6, after starting the standby screen display process, in S110, the controller 11 refers to the tab setting table and obtains the attribute of each tab registered on the tab setting table. In S110, the controller 11 may obtain a tab name of each tab registered on the tab setting table.

For instance, in S110, the controller 11 may obtain the tab setting table from an external device (e.g., the information processing device 20), obtain the attribute of each tab registered on the tab setting table, and store the tab setting table into the memory 12. In another instance, in S110, the controller 11 may read, out of the memory 12, the tab setting table that has been obtained during earlier execution of S110 and stored into the memory 12, and may obtain the attribute of each tab registered on the tab setting table.

In S120, the controller 11 determines whether the user authentication function is set active or inactive. When determining that the user authentication function is set inactive (S120: Inactive), the controller 11 goes to S130. In S130, the controller 11 performs a first display process to display the standby screen 40 (see e.g., FIG. 2A) specific in the case where the user authentication function is inactive.

Figure 7:
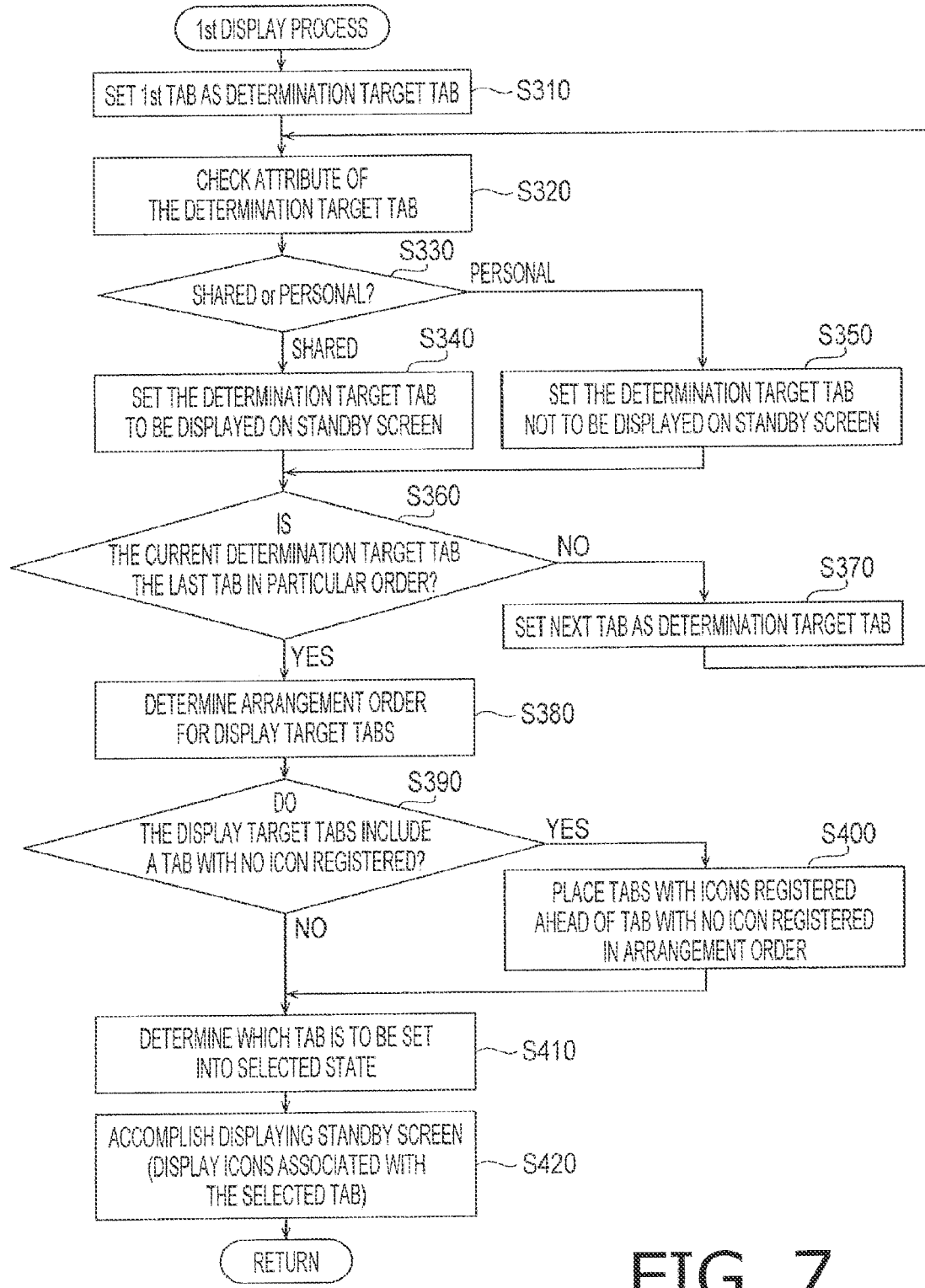
FIG. 7 is a flowchart showing a procedure of a first display process to be performed in the standby screen display process, in the illustrative embodiment according to one or more aspects of the present disclosure.

FIG. 7 shows a detailed procedure of the first display process. Specifically, in the first display process, the controller 11 sets the first tab as a determination target tab in S310. In S320, the controller 11 checks the attribute of the determination target tab on the basis of the attribute, obtained in S110 (see FIG. 6), of each tab registered on the tab setting table.

In S330, the controller 11 determines whether the attribute of the determination target tab is "Shared" or "Personal." When determining that the attribute of the determination target tab is "Shared" (S330: Shared), the controller 11 goes to S340. In S340, the controller 11 sets the determination target tab to be displayed on the standby screen 40. Thereafter, the controller 11 goes to S360. Meanwhile, when determining that the attribute of the determination target tab is "Personal" (S330: Personal), the controller 11 goes to S350. In S350, the controller 11 sets the determination target tab not to be displayed on the standby screen 40. Thereafter, the controller 11 goes to S360.

In S360, the controller 11 determines whether the current determination target tab is the last tab in the aforementioned particular order among all the tabs registered on the tab setting table. When determining that the current determination target tab is not the last tab (S360: No), the controller 11 goes to S370. In S370, the controller 11 sets, as the determination target tab, a next tab of the current determination target tab in the particular order among all the tabs registered on the tab setting table. Afterward, the controller 11 goes back to S320. Thus, sequentially in the particular order for each of all the tabs registered on the tab setting table, the controller 11 performs S340 or S350 based on the attribute of each tab, thereby determining whether each individual tab is to be displayed on the standby screen 40.

When determining that the current determination target tab is the last tab (S360: Yes), the controller 11 goes to S380. In S380, with respect to the tabs (hereinafter referred to as the "display target tabs") set in S340 to be displayed on the standby screen 40, the controller 11 determines an arrangement order for arranging the display target tabs along the aforementioned arrangement direction on the standby screen 40. Specifically, for instance, the controller 11 determines the arrangement order according to the particular order.

In S390, the controller 11 determines whether the display target tabs include a tab having no icon registered therewith. When determining that the display target tabs do not include a tab having no icon registered therewith (S390: No), the controller 11 goes to S410.

Meanwhile, when determining that the display target tabs include a tab having no icon registered therewith (S390: Yes), the controller 11 goes to S400. In S400, the controller 11 adjusts the arrangement order determined in S380 in such a manner that one or more tabs each having one or more icons registered therewith are placed ahead, in the adjusted arrangement order, of the tab having no icon registered therewith. Specifically, for instance, the controller 11 may move the tab having no icon registered therewith to the rear of the display target tabs arranged in the arrangement order.

In S410, the controller 11 determines which tab is to be brought into the selected state among the display target tabs. For instance, the controller 11 may set a first display target tab (i.e., a leftmost tab in the arrangement direction in each of FIGS. 2A to 2B and 5A to 5D) in the arrangement order into the selected state. In S420, the controller 11 accomplishes displaying the standby screen 40 in accordance with the results obtained in the steps through S410. After the standby screen 40 has been displayed in S420, the controller 11 goes to S140 (see FIG. 6).

In S140, the controller 11 determines whether the attribute of a tab registered on the tab setting table has been changed. When determining that the attribute of a tab registered on the tab setting table has been changed (S140: Yes), the controller 11 goes to S130. In S130, the controller 11 performs the first display process.

In S120, when determining that the user authentication function is set active (S120: Active), the controller 11 goes to S160. In S160, the controller 11 sets the user mode to the public mode. In S170, the controller 11 displays the user-mode switching I/F 36 on the standby screen 40. In S180, the controller 11 performs the first display process in the same manner as in S130. Thereby, the controller 11 displays the standby screen 40 for the public mode, as shown in FIG. 2B.

In S190, the controller 11 determines whether a user-mode switching operation has been performed. The user-mode switching operation is an operation of selecting one of the selectable options on the aforementioned user-mode selecting screen displayed when the user-mode switching I/F 36 is tapped.

When determining that the user-mode switching operation has been performed (S190: Yes), the controller 11 goes to S200. In S200, the controller 11 determines whether the selected one of the selectable options is associated with the public mode or the personal mode. When determining that the selected one of the selectable options is associated with the public mode (i.e., when an operation of switching the user mode from the personal mode to the public mode has been performed) (S200: General), the controller 11 goes to S160.

Meanwhile, when determining that the selected one of the selectable options is associated with the personal mode (i.e., when an operation of switching the user mode from the public mode to the personal mode or switching the login user from one user to another in the personal mode has been performed) (S200: Personal), the controller 11 goes to S210. In S210, the controller 11 performs a login process for the selected new registered user.

In S220, the controller 11 displays the user-mode switching I/F 36 on the standby screen 40, in the same manner as in S170. In S230, the controller 11 obtains, from the user list (see FIG. 4), setting information of the personal registration tab for the registered user who is currently logging in to the image processing apparatus 10. In the illustrative embodiment, as described above, the controller 11 refers to the user list managed on the information processing device 20 via data communication with the information processing device 20, and obtains the setting information of the personal registration tab associated with the login user on the user list.

Figure 8A:
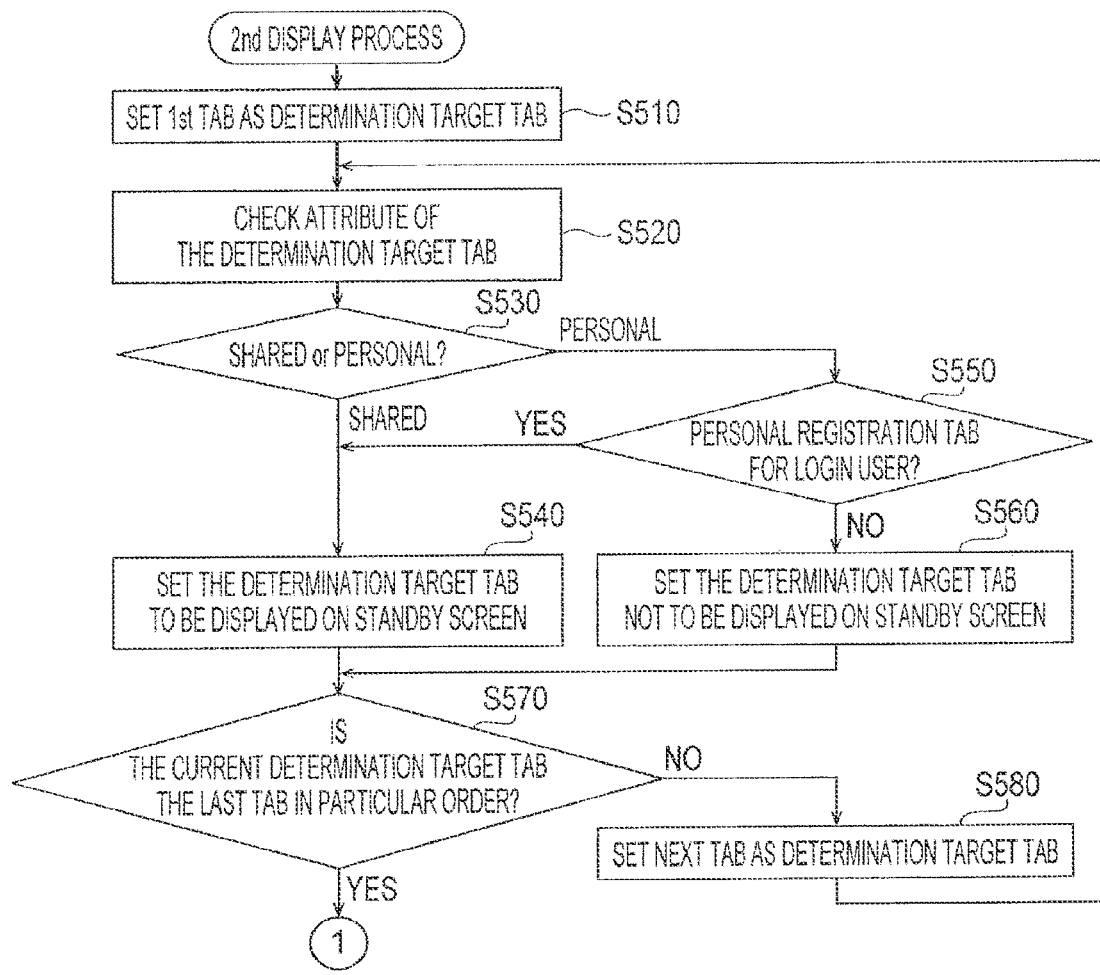
FIGS. 8A and 8B are flowcharts showing a procedure of a second display process to be performed in the standby screen display process, in the illustrative embodiment according to one or more aspects of the present disclosure.
Figure 8B:
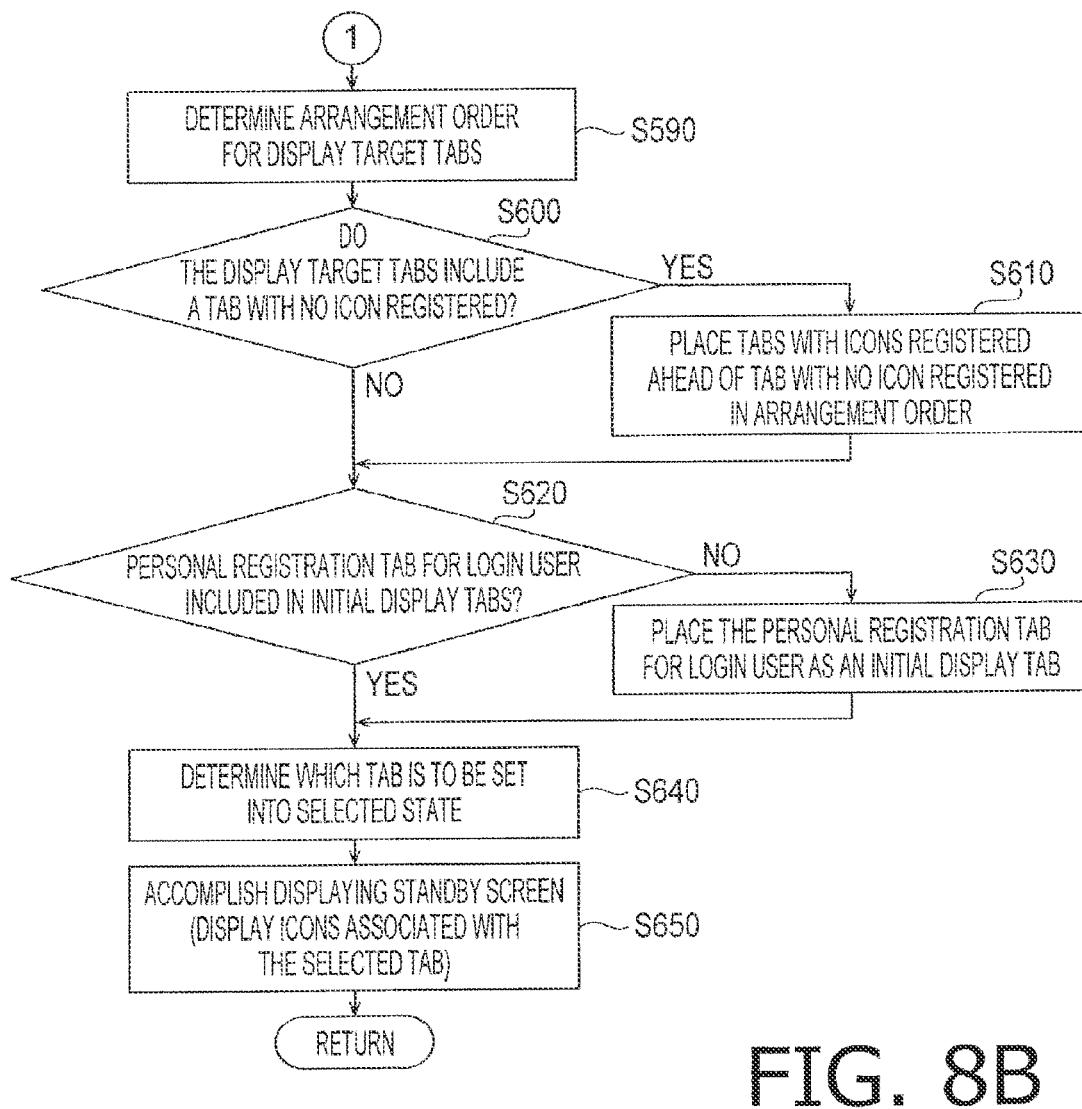

In S240, the controller 11 performs a second display process. In the second display process, the controller 11 displays the standby screen 40 for the personal mode. After S240, the controller 11 goes to S190. FIGS. 8A and 8B show a detailed procedure of the second display process in S240. In the second display process, the controller 11 sets the first tab as the determination target tab in S510. In S520, the controller 11 checks the attribute of the determination target tab on the basis of the attribute, obtained in S110 (see FIG. 6), of each tab registered on the tab setting table.

In S530, the controller 11 determines whether the attribute of the determination target tab is "Shared" or "Personal." When determining that the attribute of the determination target tab is "Shared" (S530: Shared), the controller 11 goes to S540. In S540, the controller 11 sets the determination target tab to be displayed on the standby screen 40. Thereafter, the controller 11 goes to S570. Meanwhile, when determining that the attribute of the determination target tab is "Personal" (S530: Personal), the controller 11 goes to S550.

In S550, the controller 11 determines whether the determination target tab is the personal registration tab for the login user. When determining that the determination target tab is the personal registration tab for the login user (S550: Yes), the controller 11 goes to S540. In S540, the controller 11 sets the personal registration tab for the login user to be displayed on the standby screen 40, and then goes to S570. Meanwhile, when determining that the determination target tab is not the personal registration tab for the login user (S550: No), the controller 11 goes to S560. In S560, the controller 11 sets the determination target tab not to be displayed on the standby screen 40, and then goes to S570.

In S570, the controller 11 determines whether the current determination target tab is the last tab in the aforementioned particular order among all the tabs registered on the tab setting table. When determining that the current determination target tab is not the last tab (S570: No), the controller 11 goes to S580. In S580, the controller 11 sets, as the determination target tab, a next tab of the current determination target tab in the particular order among all the tabs registered on the tab setting table. Afterward, the controller 11 goes back to S520.

When determining that the current determination target tab is the last tab (S570: Yes), the controller 11 goes to S590. In S590, with respect to the tabs (i.e., the display target tabs) set in S540 to be displayed on the standby screen 40, the controller 11 determines an arrangement order for arranging the display target tabs along the aforementioned arrangement direction on the standby screen 40. Specifically, for instance, in S590, the controller 11 first determines the arrangement order according to the particular order. Subsequently, when a tab having the attribute "Personal" is placed ahead of a tab having the attribute "Shared" in the arrangement order, the controller 11 moves the tab having the attribute "Personal" to the rear of the tab having the attribute "Shared." Thus, the controller 11 basically determines the arrangement order according to the particular order, and then adjusts the arrangement order as a whole in such a manner that tabs having the attribute "Shared" are placed ahead of tabs having the attribute "Personal" in the adjusted arrangement order.

After determining the arrangement order as set forth above, in S600, the controller 11 determines whether the display target tabs include a tab having no icon registered therewith, in the same manner as in S390. When determining that the display target tabs do not include a tab having no icon registered therewith (S600: No), the controller 11 goes to S620.

Meanwhile, when determining that the display target tabs include a tab having no icon registered therewith (S600: Yes), the controller 11 goes to S610. In S610, the controller 11 adjusts the arrangement order determined in S590 in such a manner that one or more tabs each having one or more icons registered therewith are placed ahead, in the adjusted arrangement order, of the tab having no icon registered therewith, in the same manner as in S400.

In S620, the controller 11 determines whether the personal registration tab for the login user is included in initial display tabs. The initial display tabs represent display target tabs of the maximum concurrently-displayable tab number from the first display target tab in the arrangement order. Namely, in S620, the controller 11 determines whether the personal registration tab for the login user is displayed on the standby screen 40 on which the initial display tabs are arranged in the current arrangement order.

When determining that the personal registration tab for the login user is included in the initial display tabs (S620: Yes), the controller 11 goes to S640. Meanwhile, when determining that the personal registration tab for the login user is not included in the initial display tabs (i.e., when all the tabs of the maximum concurrently-displayable tab number from the first display target tab in the arrangement order have the attribute "Shared") (S620: No), the controller 11 goes to S630. In S630, the controller 11 places the personal registration tab for the login user as an initial display tab. Specifically, in S630, the controller 11 replaces one of the display target tabs of the maximum concurrently-displayable tab number from the first display target tab in the arrangement order, with the personal registration tab for the login user.

In S640, the controller 11 determines which tab is to be brought into the selected state among the display target tabs, in the same manner as in S410. In S650, the controller 11 accomplishes displaying the standby screen 40 in accordance with the results obtained in the steps through S640.

(6) Advantageous Effects of Illustrative Embodiment

In the illustrative embodiment, when the user mode of the image processing apparatus 10 is set to the public mode, any tabs having the attribute "Personal" are not displayed, but the tabs having the attribute "Shared" are displayed on the standby screen 40. Meanwhile, when the user mode is set to the personal mode, the tabs having the attribute "Shared" are displayed on the standby screen 40 as well as the personal registration tab for a registered user associated with the currently-set personal mode. As described above, the personal registration tab for each registered user may be a tab having the attribute "Personal" or a tab having the attribute "Shared."

Thus, in the illustrative embodiment, regardless of whether the user mode is set to the public mode or the personal mode, appropriate tabs for the set user mode are displayed on the standby screen 40. In addition, when the user mode is set to the personal mode, not only the personal registration tab for a corresponding registered user but also the tabs having the attribute "Shared" are displayed on the standby screen 40. Therefore, even when the registered user wishes to use an icon registered with a tab having the attribute "Shared," the registered user may use the icon while maintaining the user mode set to the personal mode. Thus, according to the illustrative embodiment, it is possible to improve the user-friendliness of the image processing apparatus 10 in the personal mode.

Hereinabove, the illustrative embodiment according to aspects of the present disclosure has been described. Aspects of the present disclosure may be practiced by employing conventional materials, methodology and equipment. Accordingly, such materials, equipment and methodology are not set forth herein in detail. In the previous descriptions, numerous specific details are set forth, such as specific materials, structures, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

Modifications

In the second display process shown in FIGS. 8A and 8B, in S590, the controller 11 may determine the arrangement order according to the particular order without adjusting the arrangement order, in the same manner as in S380 (see FIG. 7). Further, for instance, either the steps S600 to S610 or the steps S620 to S630 may be omitted. In another instance, the steps S600 to S610 and the steps S620 to S630 may be executed in a reverse sequence. Namely, the steps S620 to S630 may be executed prior to the steps S600 to S610.

Further, in S590, unlike the aforementioned illustrative embodiment, the controller 11 may adjust the arrangement order in such a manner that tabs having the attribute "Personal" are placed ahead of tabs having the attribute "Shared" in the adjusted arrangement order. Namely, the controller 11 may appropriately determine how to arrange the display target tabs, including both the tabs having the attribute "Shared" and the tabs having the attribute "Personal," on the standby screen 40 in the personal mode.

In the aforementioned illustrative embodiment, the maximum number (i.e., the maximum concurrently-displayable tab number) of tabs displayable concurrently on the standby screen 40 is 4. Further, 8 icons are arranged on each single tab screen 50. Nonetheless, the maximum concurrently-displayable tab number may be a number other than 4. Further, the number of icons arranged on each single tab screen 50 may be a number other than 8. A plurality of functions of a single element exemplified in the aforementioned illustrative embodiment may be achieved by a plurality of elements. A single function of a single element exemplified in the aforementioned illustrative embodiment may be achieved by a plurality of elements. Respective functions of a plurality of elements exemplified in the aforementioned illustrative embodiment may be achieved by a single element. A single function achieved by a plurality of elements exemplified in the aforementioned illustrative embodiment may be achieved by a single element. A part of a configuration exemplified in the aforementioned illustrative embodiment may be omitted. At least a part of a configuration exemplified in the aforementioned illustrative embodiment may be added to or replaced with another configuration exemplified in the aforementioned illustrative embodiment.

The following shows examples of associations between elements exemplified in the aforementioned illustrative embodiment and modifications and elements according to aspects of the present disclosure. The image processing apparatus 10 may be an example of a "display control apparatus" according to aspects of the present disclosure. The display 13 may be an example of a "display" according to aspects of the present disclosure. The input I/F 14 may be an example of an "input interface" according to aspects of the present disclosure. The controller 11 may be an example of a "controller" according to aspects of the present disclosure. The first communication I/F 18 may be an example of a "communication interface" according to aspects of the present disclosure. The memory 12 may be an example of a "memory" according to aspects of the present disclosure. The memory 12 storing the program 12a may be an example of a "non-transitory computer-readable medium storing computer-readable instructions" according to aspects of the present disclosure. The icons 51 to 58 may be an example of "one or more function objects" according to aspects of the present disclosure.

What is claimed is:

1. An image forming apparatus comprising:
   a user interface including a display;
   an image scanner;
   a printer; and
   a controller configured to:
      perform a plurality of types of image processing including image scanning processing with the image scanner and copy processing with the image scanner and the printer;
      cause the display to display a standby screen configured to display thereon a selected one of a plurality of screens switchable from one screen to another;
      when a first user is logging in to the image forming apparatus, perform:
         displaying a plurality of first icons to be arranged in a particular form of a plurality of rows and a plurality of columns within a particular area on the standby screen, the plurality of first icons being enabled to include an icon associated with the image scanning processing, an icon associated with the copy processing, and one or more icons not associated with the plurality of types of image processing;
         in said displaying the plurality of first icons, displaying, as the plurality of first icons, one or more icons associated with the first user, and one or more icons not associated with a second user, to be arranged in the particular form within the particular area, without displaying any icons associated with the second user, the second user being different from the first user; and
         displaying information other than the plurality of first icons outside the particular area; and
      when the second user is logging in to the image forming apparatus, perform:
         displaying the plurality of second icons to be arranged in the particular form of the plurality of rows and the plurality of columns within the particular area on the standby screen, the plurality of second icons being enabled to include the icon associated with the image scanning processing, the icon associated with the copy processing, and the one or more icons not associated with the plurality of types of image processing;
         in said displaying the plurality of second icons, displaying, as the plurality of second icons, one or more icons associated with the second user, and one or more icons not associated with the first user, to be arranged in the particular form within the particular area, without displaying any icons associated with the first user; and
         displaying information other than the plurality of second icons outside the particular area.

2. The image forming apparatus according to claim 1, wherein the controller is further configured to display an icon for menu as the one or more icons not associated with the plurality of types of image processing.

3. The image forming apparatus according to claim 1, further comprising a communication interface,
   wherein the controller is further configured to:
      perform the plurality of types of image processing further including fax processing with the communication interface;
      when the first user is logging in to the image forming apparatus, perform:
         displaying the plurality of first icons to be arranged in the particular form of the plurality of rows and the plurality of columns within the particular area on the standby screen, the plurality of first icons being enabled to include the icon associated with the image scanning processing, the icon associated with the copy processing, an icon associated with the fax processing, and the one or more icons not associated with the plurality of types of image processing; and
         in said displaying the plurality of first icons, displaying, as the plurality of first icons, the one or more icons associated with the first user, and the one or more icons not associated with the second user, to be arranged in the particular form within the particular area, without displaying any icons associated with the second user; and
      when the second user is logging in to the image forming apparatus, perform:

displaying the plurality of second icons to be arranged in the particular form of the plurality of rows and the plurality of columns within the particular area on the standby screen, the plurality of second icons being enabled to include the icon associated with the image scanning processing, the icon associated with the copy processing, the icon associated with the fax processing, and the one or more icons not associated with the plurality of types of image processing; and in said displaying the plurality of second icons, displaying, as the plurality of second icons, the one or more icons associated with the second user, and the one or more icons not associated with the first user, to be arranged in the particular form within the particular area, without displaying any icons associated with the first user.

4. The image forming apparatus according to claim 1, wherein the controller is further configured to:
when the first user is logging in to the image forming apparatus, display a user name of the first user outside the particular area on the standby screen; and
when the second user is logging in to the image forming apparatus, display a user name of the second user outside the particular area on the standby screen.

5. The image forming apparatus according to claim 1, wherein the controller is further configured to, when there is no user logging in to the image forming apparatus, display no user name outside the particular area on the standby screen.

6. The image forming apparatus according to claim 1, wherein the controller is further configured to display, outside the particular area on the standby screen, an object to make a transition from a state where no user is logging in to the image forming apparatus to a state where a user is logging in to the image forming apparatus.

7. The image forming apparatus according to claim 1, wherein the controller is further configured to display, outside the particular area on the standby screen, an object to make a transition from a state where a user is logging in to the image forming apparatus to a state where no user is logging in to the image forming apparatus.

8. The image forming apparatus according to claim 1, wherein an outside of the particular area on the standby screen includes an area above the particular area, and an area below the particular area.

9. The image forming apparatus according to claim 1, wherein the controller is further configured to display an object indicating a network outside the particular area on the standby screen.

10. The image forming apparatus according to claim 1, wherein the controller is further configured to display an object indicating a wireless network outside the particular area on the standby screen.

11. The image forming apparatus according to claim 1, wherein the controller is further configured to:
allow the first user to log in to the image forming apparatus in response to receiving an input of user authentication information associated with the first user via the user interface; and
allow the second user to log in to the image forming apparatus in response to receiving an input of user authentication information associated with the second user via the user interface.

12. The image forming apparatus according to claim 1, wherein the printer is configured to perform printing using an inkjet technology.

13. The image forming apparatus according to claim 1, wherein the display included in the user interface includes an organic EL display device.

14. The image forming apparatus according to claim 1, wherein the display included in the user interface includes a liquid crystal display device.

15. The image forming apparatus according to claim 1, wherein the user interface includes one or more operable keys.

16. The image forming apparatus according to claim 1, wherein the user interface includes a mouse.

17. The image forming apparatus according to claim 1, wherein the display included in the user interface is a touch panel display.

18. The image forming apparatus according to claim 1, wherein the printer is configured to perform printing using an electrophotographic technology.

* * * * *